US012491520B2

(12) United States Patent
Pierpaoli et al.

(10) Patent No.: US 12,491,520 B2
(45) Date of Patent: Dec. 9, 2025

(54) CRUSHER AND CRUSHING MACHINE COMPRISING SAID CRUSHER

(71) Applicant: PIERALISI MAIP SOCIETA' PER AZIONI, Jesi (IT)

(72) Inventors: Martina Pierpaoli, Senigallia (IT); Maurizio Servili, Montefalco (IT); Simone Giardinieri, Jesi (IT); Simone Stroppa, Fabriano (IT)

( * ) Notice: Subject to any disclaimer, the term of this patent is extended or adjusted under 35 U.S.C. 154(b) by 292 days.

(21) Appl. No.: 18/460,247

(22) Filed: Sep. 1, 2023

(65) Prior Publication Data

US 2024/0075479 A1 Mar. 7, 2024

(30) Foreign Application Priority Data

Sep. 5, 2022 (IT) ........................ 102022000018102

(51) Int. Cl.

*B02C 13/28* (2006.01)
*B02C 13/06* (2006.01)
*B02C 13/284* (2006.01)

(52) U.S. Cl.

CPC ........ *B02C 13/2804* (2013.01); *B02C 13/284* (2013.01)

(58) Field of Classification Search

CPC .... A23N 1/02; B02C 13/284; B02C 13/2804; B02C 13/28; B02C 2013/2808; B02C 2013/2812

See application file for complete search history.

(56) References Cited

U.S. PATENT DOCUMENTS 2,986,347 A * 5/1961 Stevenson ........... B02C 13/2804 241/73
2008/0041992 A1 * 2/2008 Hall ........................ B02C 13/09 241/189.1

FOREIGN PATENT DOCUMENTS

DE 2419835 A1 * 11/1975 ........... B02C 13/286
EP 3865214 A1 12/2022

OTHER PUBLICATIONS

Translation of DE-2419835.*

* cited by examiner

*Primary Examiner* — Bobby Yeonjin Kim

(74) *Attorney, Agent, or Firm* — Egbert, McDaniel & Swartz, PLLC

(57) ABSTRACT

Disclosed is a crusher of a crushing machine applied to oleaginous fruits, such as olives and the like. The crusher has a central hub with a central axis and a plurality of hammers connected to the central hub and arranged around the central hub. Each hammer has an outer edge facing a direction opposite to the central hub. The outer edge of each hammer is toothed in such a way that the hammer has at least one recess and two teeth separated by a recess.

9 Claims, 6 Drawing Sheets

CRUSHER AND CRUSHING MACHINE COMPRISING SAID CRUSHER

FIELD OF THE INVENTION

The present invention relates to an improved crusher and to a crushing machine comprising said crusher. The present invention relates specifically to the crushing process of oleaginous fruits.

The field of reference is the oil industry, that is, the field involving the processing of oleaginous fruits, such as olives and the like, for the purpose of producing oil.

BACKGROUND OF THE INVENTION

As it is well known in the production of oil from olives or other vegetable oil sources, the olives or other oleaginous fruits undergo a so-called preliminary crushing treatment in order to break the fruits with the stone to produce a paste that is then used in a successive kneading process.

The crushing process consists in crushing the oleaginous fruits, particularly olives, in order to release the oil contained in the vacuoles of the oil cells. Moreover, crushing releases the endogenous enzyme complement that is responsible for the formation of the chemical and sensory characteristics of the oil (lipoxygenase, glycosidase, hydrolase, polyphenol oxidase and peroxidase).

Currently, the most popular and best performing crushing machines on the market are the so-called hammer crushers, which comprise a crushing chamber where oleaginous fruits are crushed in order to obtain a paste. The crushing chamber is laterally bordered by a grille with circular cross-section wherein a rotary crusher is arranged, comprising a central hub and hammering bodies (commonly referred to as hammers) arranged around the hub, which have a flat outer edge that grazes the inner surface of the circular grille during the rotation of the rotary crusher.

The crusher is usually rotated with a rotational speed of 1400-2800 rpm and is driven by motors of 10-40 kW power.

The oleaginous fruits are crushed inside the crushing chamber until obtaining a paste that is ejected through openings (usually holes) in the grille by centrifugal force.

The crushers with flat hammers are the most widely used on the market today because they have a high mechanical strength and they are able to uninterruptedly process high quantities of product in a continuous cycle, this being a feature that complies perfectly with the current automation requirements of industrial plants.

However, from experimental studies, the applicant has noted that such crushers are impaired by several problems that particularly affect the quality, the characteristics and the organoleptic properties of the final oil. Otherwise said, the use of such crushers might negatively affect the quality aspects of virgin olive oils.

The aforementioned problems are due in particular to the configuration of the edge of the hammer. Being flat, said edge grazes the inner surface of the circular-section grille for its entire extension.

In fact, the continuous grazing of the flat edge against the inner surface of the grille results in:

- a violent and non-differentiated crushing on the various parts of the fruit (skin, pulp and stone);
- an excessive impact on the seed, resulting in an excessive release of the enzymes responsible for the oxidation of polyphenols with a consequent reduction in the quality of virgin olive oils;

- an overheating of the paste that negatively affects the quality of the oil;
- an inadequate homogeneity of the paste;
- an increased possibility of formation of water-oil emulsion due to excessive overheating of the paste and to the violent crushing of the fruits. The water-oil emulsion compromises the extraction yield and the quality of the final oil.

DE2419835A1 describes a waste crusher.

EP3865214A1 describes an olive crusher comprising a crusher with parallelepiped hammers.

BRIEF SUMMARY OF THE INVENTION

The purpose of the present invention is to solve the aforementioned problems by improving the crushing technique of oleaginous fruits through a technological innovation that concerns a new hammer having the same mechanical strength as the crushers with flat hammers of the prior art (the so-called flat hammer crushers) and at the same time is able to crush the oleaginous fruits in a performant manner in order to optimize the quality of the paste and consequently of the final product.

These purposes are achieved in accordance with the invention with the features listed in the attached independent claim 1.

Advantageous achievements appear from the dependent claims.

The new crusher according to the invention is defined by claim 1.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
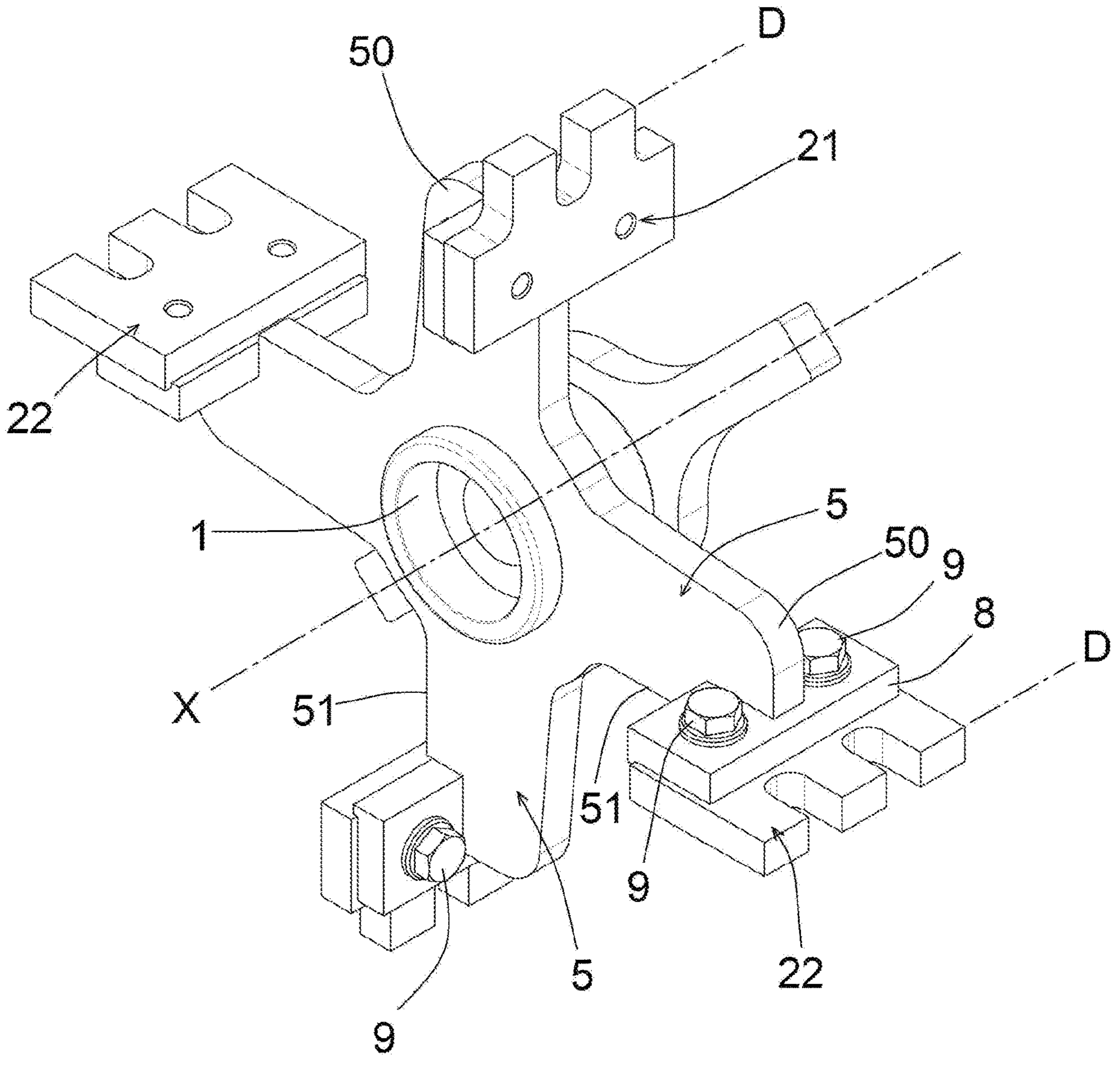
FIG. 1 is an axonometric view of the crusher according to the invention.

Referring to FIGS. 1, 1A, 2, 3, and 4, a crusher according to the invention is described, which is collectively indicated with reference numeral 100.

Figure 5:
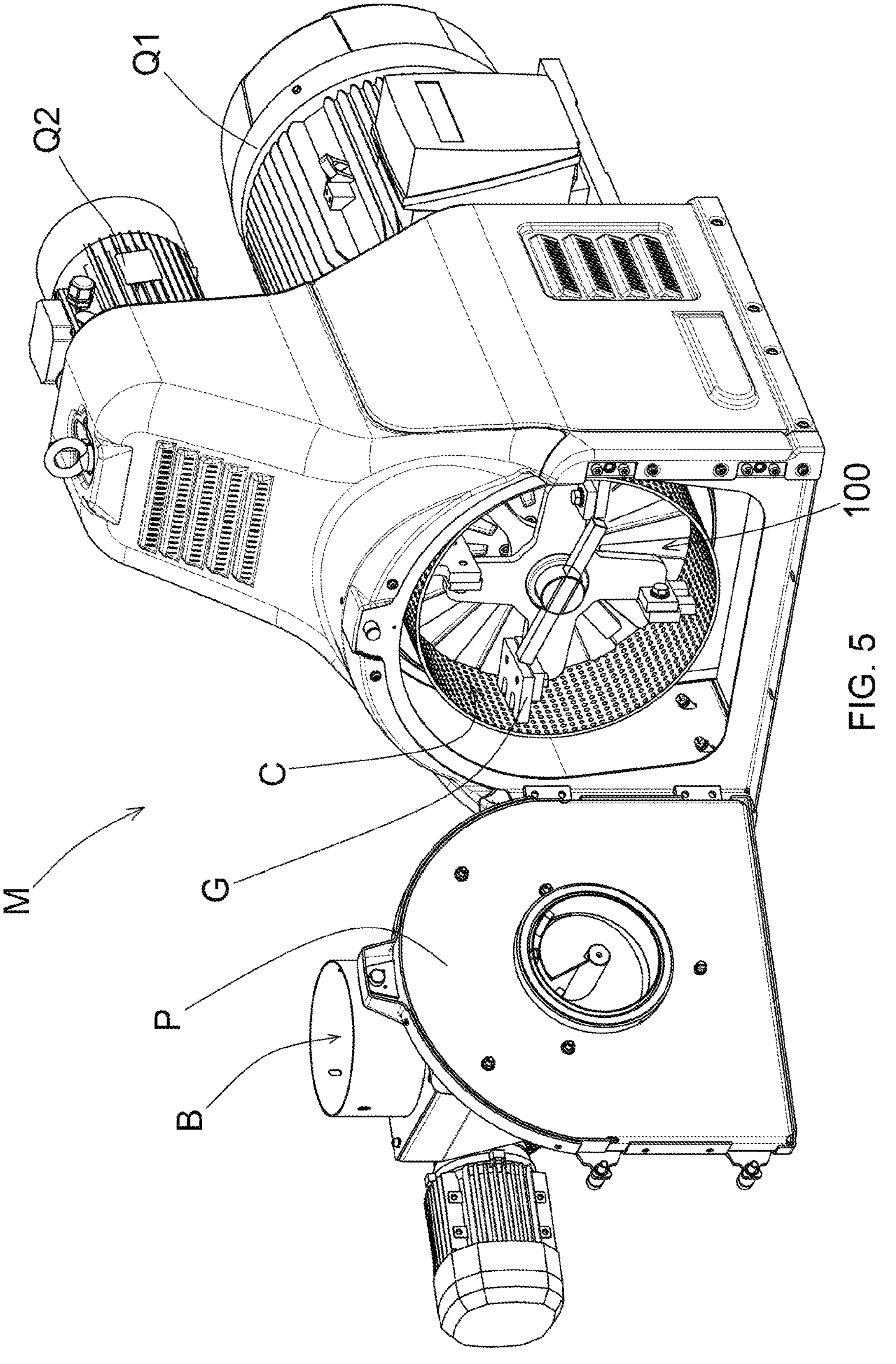
FIG. 5 is an axonometric view of a crushing machine comprising the crusher according to the invention.

The crusher (100) according to the invention is intended to be an integral part of a crushing machine (M) shown in particular in FIG. 5.

The crushing machine (M) comprises:

- a crushing chamber (C) suitable for containing oleaginous fruits, particularly olives, to be crushed into a paste;
- a grille (G) with a circular cross-section that laterally borders the crushing chamber (C);
- the crusher (100) according to the invention arranged in the grille (G);
- rotation means (Q1, Q2) for said grille (G) and/or for said crusher (100);
- a loading hopper (B) for loading the oleaginous fruits into the crushing chamber (C); the loading mouth is connected to a front door (P) suitable for closing the crushing chamber (C);
- an unloading mouth, not shown in the attached figures, to discharge the puree obtained from crushing the oleaginous fruits.

Preferably, the rotation means (Q1, Q2) are configured to rotate the grille (G) and the crusher (100) in opposite directions. More precisely, the rotation means (Q1, Q2) include a first motor (Q1) connected to the crusher (100) and a second motor (Q2) connected to the grille (G).

The pulp discharged from the crushing machine (M) is then processed through a kneading process known to a specialist of the field.

Referring to FIG. 1, the crusher (100) comprises a central hub (1) with a central axis (X) and a plurality of hammers (21, 22), namely four hammers (21, 22), connected to the central hub (1) and arranged around the central hub (1). The hammers (21, 22) are angularly equispaced around the central hub (1).

The hammers (21, 22) are suitable for cooperating with the grille (G) with circular cross-section arranged around the crusher (100). In the attached figures, there are four hammer (21, 22), however, nothing would change for the purpose of achieving the objectives pursued by the invention if said hammers (21, 22) were fewer or more in number.

The crusher (100) further comprises a plurality of arms (5) radially extending from the hub (1). Each arm (5) comprises an end section (50) on which one of said hammers (21, 22) is disposed.

Each arm (5) comprises a front face, a rear face, and two side faces (51) on one of which an attachment plate (8) for a hammer (21, 22) is attached.

The attachment plate (8) is welded to the side face (51) of the arm at a lowered end section of the side face (51).

The hammer (21, 22) is connected to the attachment plate (8) by means of threaded connection means (9), such as bolts, so as to allow an easy replacement of the hammer (21, 22) when needed.

Each hammer (21, 22) is provided with an outer edge (20) that faces an opposite direction to the central hub (1) and is suitable for grazing the grille (G).

The outer edge (20) of each hammer (21, 22) extends lengthwise in a direction (D) parallel to the central axis (X) of the central hub (1).

The outer edge (20) of each hammer (21, 22) is toothed so that said hammer (21, 22) has at least one recess (4) and two teeth (3) separated by said recess (4).

In such a way, the outer edge (20) grazes the grille (G) only with the teeth (3) and not in correspondence with the recesses (4).

Preferably, the teeth (3) of a hammer (21) are staggered with respect to the teeth (3) of the adjacent hammer (22) so that the portions of the grille (G) that are not grazed by a hammer (21) are grazed by another hammer (22), thus allowing the entire surface of the grille (G) to be grazed during a 360° rotation of the crusher.

As shown in the attached figures, the hammers (21, 22) are divided into two types of alternated hammers (21, 22), namely:

- first hammers (21) comprising two teeth (3) and one recess (4) (see FIG. 2); and
- second hammers (22) comprising three teeth (3) and two recesses (4) (see FIG. 3).
- Preferably, the teeth (3) of a hammer (21) are staggered with respect to the teeth (3) of the adjacent hammer (22) so that the two teeth (3) of the first hammers (21) coincide with the two recesses (4) of the second hammers (22).

Figure 4:
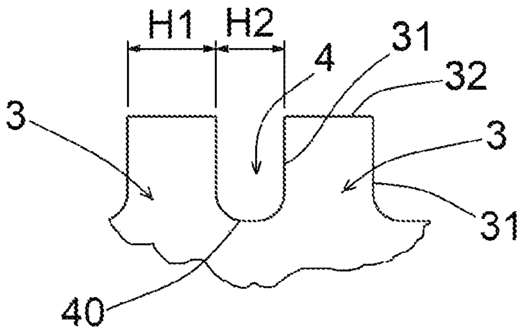
FIG. 4 is a detail view of a part of a hammer of the crusher.

With particular reference to FIG. 4, each tooth (3) comprises two side sections (31) that are parallel to each other and an upper section (32) that is flat and orthogonal to said parallel side sections (31). The recess (4) is bordered by a U-shaped bottom (40) that is laterally connected with the two side sections (31) of the two adjacent teeth (3).

Each tooth (3) has a width (H1) and said recess (4) has a width (H2).

There is a ratio of 1.3±20% tolerance between the width (H1) of the tooth (3) and the width (H2) of the recess (4).

Figure 1A:
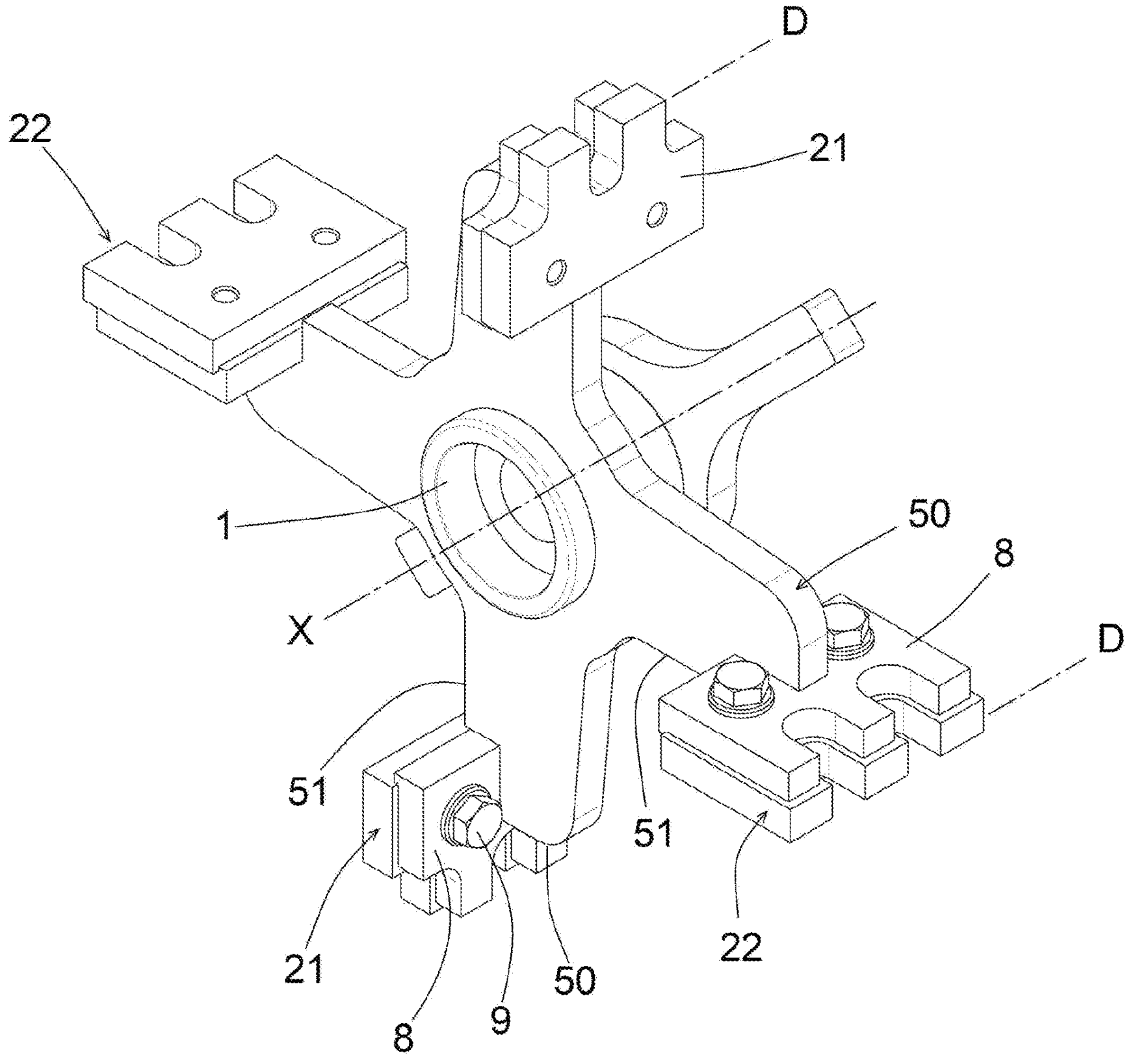
FIG. 1A is a view of the crusher of FIG. 1 with different attachment plates for the hammers.
Figure 2:
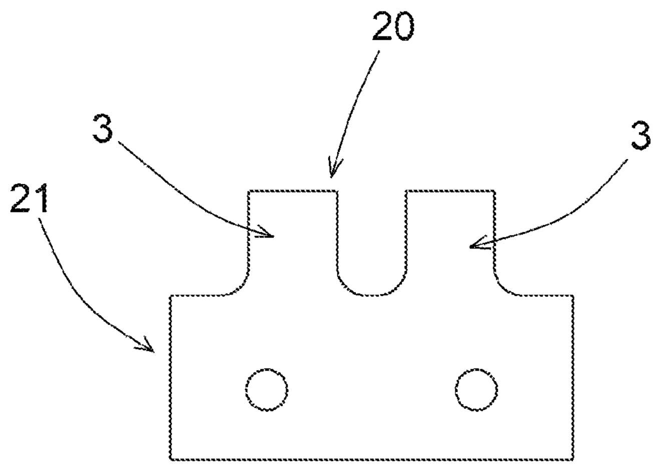
FIG. 2 is a front view of a first hammer of the crusher according to the invention.
Figure 3:
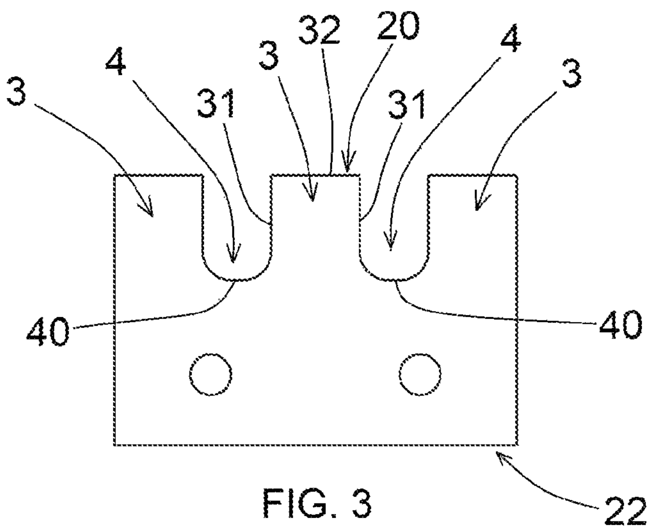
FIG. 3 is a front view of a second hammer of the crusher according to the invention.

In a preferred embodiment shown in FIG. 1A, instead of having a substantially rectangular shape, the attachment plates (8) where the hammers (21, 22) are attached substantially have the same shape as the hammers (21, 22), but a slightly smaller dimension than the hammers (21, 22). So, also the attachment plates (8) have teeth and recesses.

The provision of attachment plates (8) with essentially the same shape as the hammers (21, 22) increases the rigidity and the strength of the hammers (21, 22).

In order to appreciate the advantages of the new crusher (100) over the crushers with flat hammers of the prior art, the applicant has carried out some tests to compare the properties of an oil obtained with an oil process using a crusher according to the prior art in the crushing stage with the properties of an oil obtained with an oil process using a crusher according to the invention in the crushing stage.

In these analyses, the phenolic compounds and the volatile compounds contained in the virgin olive oils extracted according to the two crushing techniques (crushing with a crusher with flat hammers vs. crushing with a crusher with toothed hammers) were considered as comparative elements. These chemical compounds express the main quality components for a virgin olive oil.

The phenolic compounds affect the oxidative stability by acting as antioxidants and determine the sensory and health characteristics of the virgin olive oils. The greater the phenolic fraction in the oil, the greater the oxidative stability of the oil, thus increasing its shelf-life (that is to say the time in which an oil can be marketed). In particular, there is a class of phenolic compounds that are exclusively found in virgin olive oils that is classified as "secoiridoids". Numerous studies published in well-known scientific journals show that the phenolic compounds help reduce the incidence of cardio-vascular disease and carcinomas in regular consumers of extra virgin olive oil. In addition, the phenolic compounds contribute to the organoleptic characteristics of the oil, giving a bitter and spicy flavor.

The volatile compounds contained in virgin olive oils are responsible for the aroma of the oil.

Figure 6:
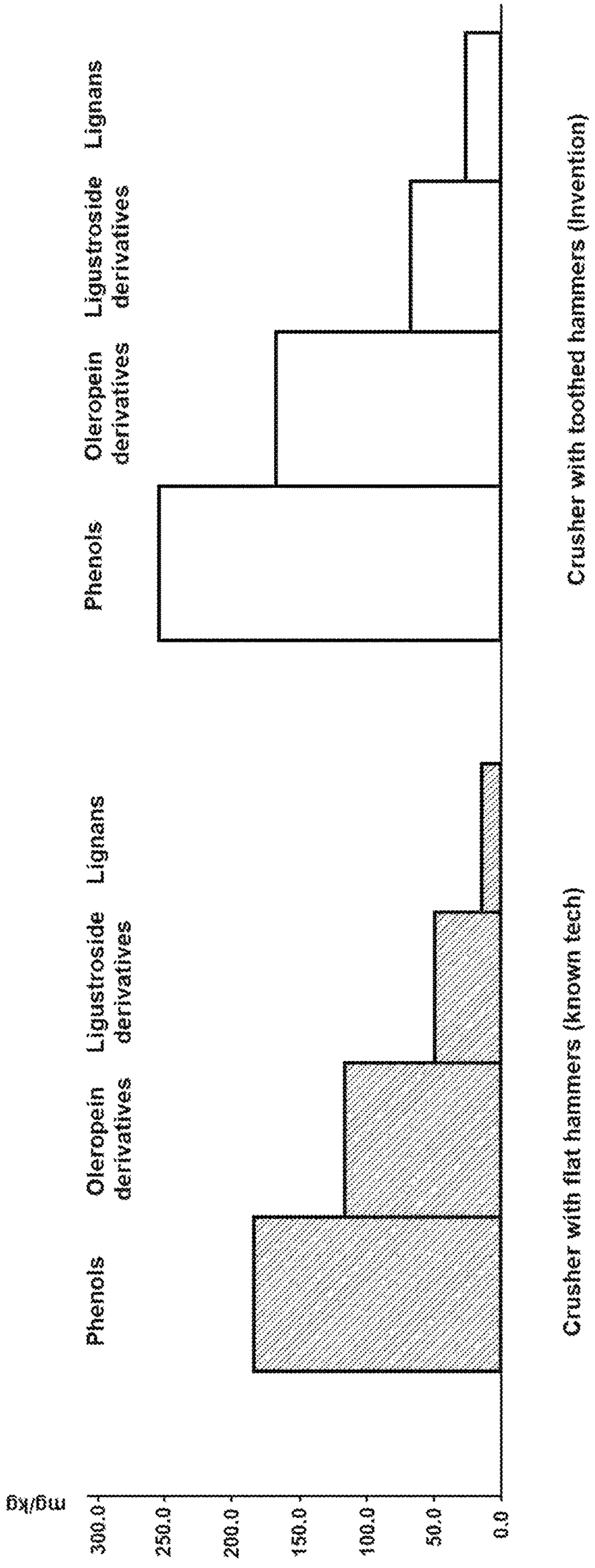
FIG. 6 is a histogram that compares the phenolic compounds of an oil obtained by means of a preliminary crushing process with a crusher of the prior art with the phenolic compounds of an oil obtained by means of a preliminary crushing process with the crusher according to the invention.
Figure 7:
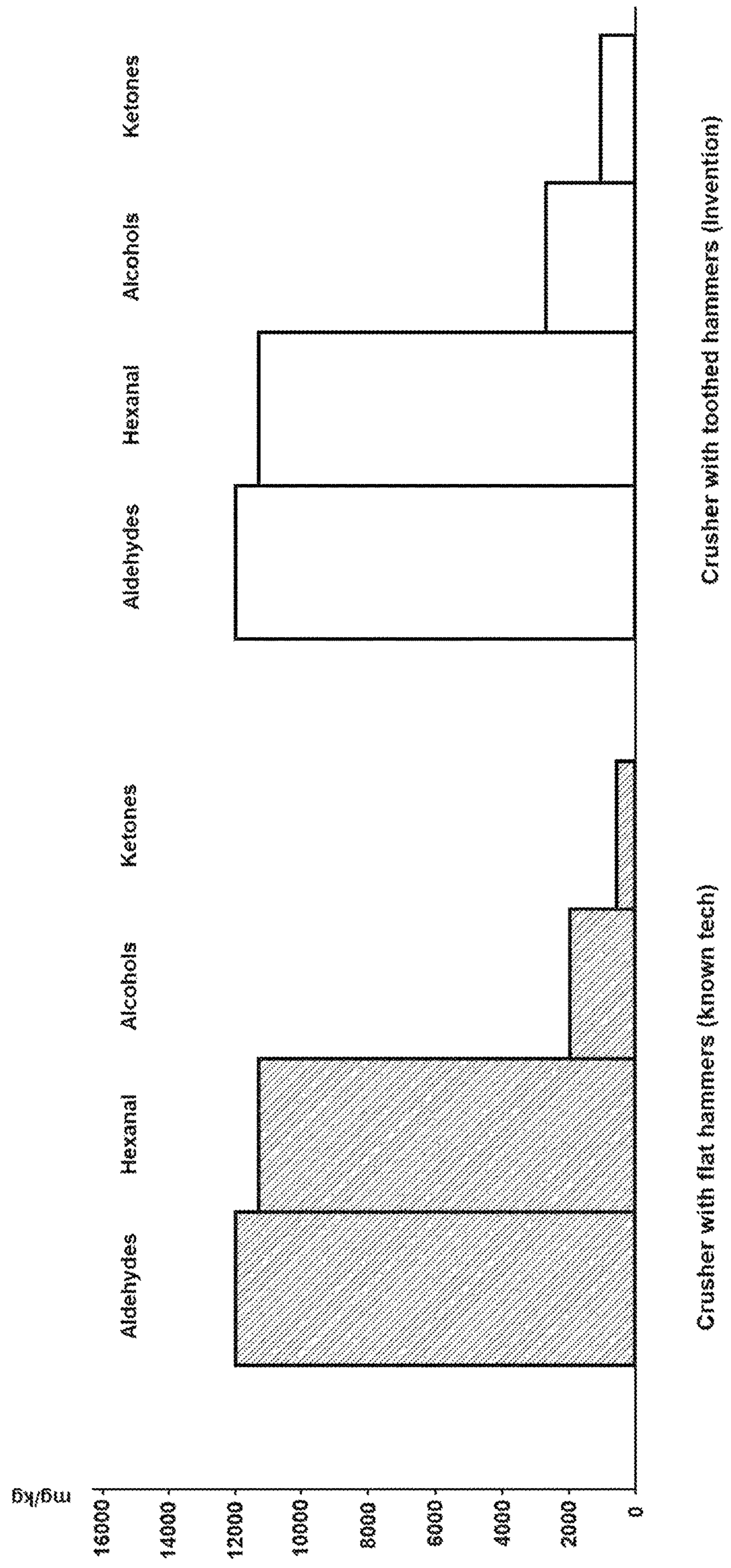
FIG. 7 is a histogram that compares the volatile components of an oil obtained by means of a preliminary crushing process with a crusher of the prior art with the volatile components of an oil obtained by means of a preliminary crushing process with the crusher according to the invention.

With reference to FIGS. 5 and 6, two histograms are shown. FIG. 5 compares the phenolic composition of the virgin olive oils obtained with the two different crushing techniques (crushing with a crusher with flat hammers vs. crushing with a crusher with toothed hammers), whereas FIG. 6 compares the volatile composition of the oils.

The two graphs clearly show that the oil obtained with a process involving the use of the crusher (100) according to the invention is characterized by a higher content of both phenolic and volatile compounds compared to the oil obtained with a process involving the use of the crusher according to the prior art. Therefore, since the remaining part of the extraction is identical, the experiments comparing the two types of hammers in the crushing stage demonstrate a general increase in the nutritional and sensory quality of the virgin olive oil obtained with the process involving the use of the crusher (100).

As a result of the foregoing description, it is now apparent that, with the present invention, the applicant has succeeded in achieving the intended purposes, namely, to provide a crusher that has the same mechanical strength as the crushers with flat hammers of the prior art and that at the same time allows for obtaining a better-quality oil.

The high mechanical strength is achieved because the crusher uses the same structural approach as the crushers of the prior art.

The improvement in the quality of the final oil is achieved because of the toothed edge (20) which allows to:

- obtain an effective crushing of the fruit skin and pulp with a less violent impact on the stone, thus limiting the oxidation of phenols and promoting the aromatic development;
- obtain an adequate homogeneity of the crushed paste;
- reduce the heating of the olive paste due to the toothed edge that generates less friction, releasing less heat when it meets and passes through the grille;
- reduce the water-oil emulsion due to a crushing technique with less impact on the stone and lower heat development.

Numerous variations and modifications of detail may be made to the present embodiment of the invention, within the reach of one skilled in the art, but still within the scope of the invention as expressed by the appended claims.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

We claim:

1. Crusher of a crushing machine applied to oleaginous fruits; wherein said crusher comprises a central hub having a central axis and a plurality of hammers connected to the central hub and arranged around the central hub; wherein said hammers are suitable for cooperating with a grille having a circular cross-section arranged around the crusher; wherein each one of the hammers comprises an outer edge facing a direction opposite to the central hub and suitable for grazing the grille; wherein said outer edge of the hammer extends in length in a direction parallel to the central axis of the central hub; wherein the outer edge of each hammer is toothed in such a way that said hammer has at least one recess and two teeth separated by said recess: wherein the teeth of a hammer are staggered with respect to the teeth of the adjacent hammer.

2. The crusher according to claim 1, wherein said hammers comprise a first hammer and a second hammer in consecutive position, wherein said first hammer comprises two teeth and one recess; wherein said second hammer comprises three teeth and two recesses.

3. The crusher according to claim 1, wherein said hammers comprise first hammers comprising two teeth and one recess and second hammers comprising three teeth and two recesses, wherein said first hammers and said second hammers are alternated with each other.

4. The crusher according to claim 1, wherein each tooth comprises two side sections parallel to each other and an upper section that is flat and orthogonal to said parallel side sections.

5. The crusher according to claim 1, wherein each tooth has a width and said recess has a width; wherein between the width of the tooth and the width of the recess there is a ratio of 1.3±20% tolerance.

6. The crusher according to claim 1, comprising a plurality of radial arms extending radially from the central hub, each one comprising an end section wherein one of said hammers is fixed.

7. The crusher according to claim 6, wherein each arm comprises a front face, a rear face, and two side faces to one of which an attachment plate for a hammer is attached, wherein a hammer is attached to the attachment plate by means of threaded connection means.

8. The crusher according to claim 7, wherein said attachment plate has the same shape as the hammers, but a smaller size than the hammer.

9. Crushing machine of oleaginous fruits, comprising a crushing chamber suitable for containing the oleaginous fruits to be crushed into a paste; a grille with circular cross-section that defines the crushing chamber laterally; a crusher according to claim 1 disposed in the grille and rotation means for said grille and/or said crusher.

* * * * *